(12) United States Patent
Kawano

(10) Patent No.: US 6,223,003 B1
(45) Date of Patent: *Apr. 24, 2001

(54) CAMERA FOR RECEIVING A ROLL FILM

(75) Inventor: Kiyoshi Kawano, Saitama (JP)

(73) Assignee: Asahi Kogaku Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/285,271

(22) Filed: Apr. 2, 1999

(30) Foreign Application Priority Data

Apr. 3, 1998 (JP) .................................................. 10-091291

(51) Int. Cl.$^7$ ...................................................... G03B 1/04
(52) U.S. Cl. ............................ 396/410; 396/413; 396/538
(58) Field of Search ..................................... 396/387, 411, 396/413, 418, 538, 410, 405

(56) References Cited

U.S. PATENT DOCUMENTS

| | | | | |
|---|---|---|---|---|
| 1,314,523 | * | 9/1919 | Kroedel | 396/538 |
| 2,029,476 | * | 2/1936 | Githens | 396/538 |
| 5,918,083 | * | 6/1999 | Aoki et al. | 396/538 |

* cited by examiner

*Primary Examiner*—Alan A. Mathews
(74) *Attorney, Agent, or Firm*—Greenblum & Bernstein, P.L.C.

(57) ABSTRACT

A camera for a roll film that is provided with a separate film strip wound around a first spool, and is provided with a second spool includes a first and second spool compartment. The roll film can be loaded into either the first or second spool compartments and the second spool can be loaded into either the second or first spool compartments, respectively. A reversible film winding mechanism winds the film strip of the roll film onto the second spool. The film winding direction can be reversed depending on which one of the first and second spool compartments the roll film is loaded into.

14 Claims, 7 Drawing Sheets

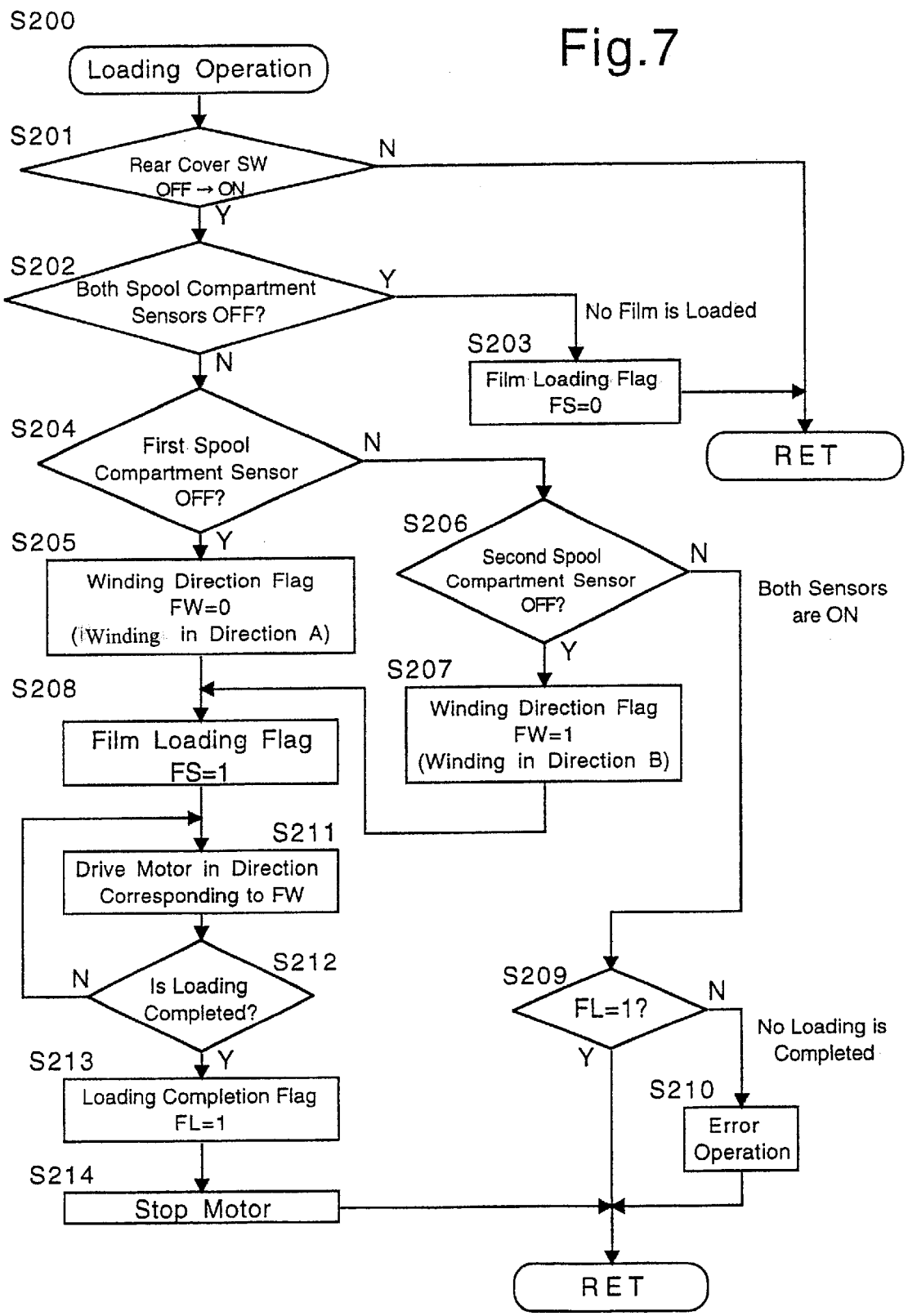

CAMERA FOR RECEIVING A ROLL FILM

BACKGROUND OF THE INVENTION

1. Field of the Invention

The present invention relates to a camera having an automatic film winding mechanism which automatically winds a roll film, and more precisely, it relates to a camera for receiving a roll film which can be advantageously applied to a medium-sized camera using a Brownie film or the like.

2. Description of the Related Art

A 135 roll film which has been most widely used is stored in a cartridge. Upon photographing, the film is loaded in a film compartment of a camera and is wound around a spool provided in a spool compartment. Upon completion of the photographing operation, the film is rewound in the cartridge and is removed from the camera. A Brownie film used in a medium-sized camera is wound around a film spool. Upon photographing, the film is wound onto another spool provided in the camera. When the Brownie film is loaded in the camera, the spool of the film is connected to a spool rotating shaft provided in the film compartment of the camera, and thereafter, the leading end of the film is wound around a film winding spool which is provided in a film winding compartment of the camera and which is connected to the spool rotating shaft, so that the photographing operation can be carried out while rotating the film winding spool by a drive source, such as a motor to wind the film. When the photographing operation for the last frame of the film is completed, the film is wound further in the same direction until the film is entirely wound on the film winding spool. Thereafter, the film is taken out together with the film winding spool from the camera. Therefore, the film spool on which the film has been wound is vacant, so that the film spool can be used as a film winding spool for a subsequent photographing operation.

In a camera using a Brownie film, in order to load a new film in the camera after an old film whose frames have been all exposed is removed from the camera, the spool remaining in the camera is moved from the film loading compartment to the film winding compartment, so that the new film can be loaded in the vacant film loading compartment. Therefore, the movement of the film spool must be carried out for each film replacement, thus resulting in a troublesome film replacement operation. In particular, each movement of the spool obstructs a fast film replacement, thus leading to missing a shutter chance.

SUMMARY OF THE INVENTION

It is an object of the present invention to provide a camera for receiving a roll film having a film winding mechanism in which no movement of the film spool is needed upon film replacement, so that a new film can be quickly loaded.

To achieve the object mentioned above, according to the present invention, there is provided a camera for receiving a roll film that is provided with a separate film strip wound around a first spool, and a second spool. The camera includes a first and second spool compartment, wherein the roll film can be loaded into either the first or second spool compartments and the second spool can be loaded into either the second or first spool compartments, respectively; and a reversible film winding mechanism that winds the film strip of the roll film onto the second spool, wherein the film winding direction can be reversed depending on which one of the first and second spool compartments the roll film is loaded into.

Preferably, the reversible film winding mechanism is driven by a reversible motor, so that the film can be unwound from the first spool compartment and wound into the second spool compartment or unwound from the second spool compartment and wound into the first spool compartment, in accordance with the forward or reverse rotation of the motor.

Preferably, the reversible film winding mechanism includes a drive gear portion which is driven by the reversible motor, and driven gear portions which are connected to spool rotating shafts provided in the spool compartments. The drive gear portion can selectively engage with the driven gear portions in accordance with the rotation direction of the reversible motor so as to transmit the rotation of the reversible motor to the selected spool rotating shaft.

Preferably, gear portions of the reversible film winding mechanism are constructed so that the rotational speeds of the spool rotating shafts and the film winding speeds are substantially the same when the motor is rotated in the forward direction and reverse direction.

Preferably, the first and second spool compartments are each provided therein with a sensor which detects whether the roll film is loaded in the associated spool compartment, and the reversible film winding mechanism determines the film winding direction to wind the film toward one of the first or second spool compartments in which no film is loaded from the other of the first and second spool compartments in which the film is loaded, in accordance with the detection result of the sensors.

Preferably, the sensors each include a photoreflector which optically detects the film wound around the spool.

Preferably, the sensors each include a switch which is brought into elastic contact with the outer surface of the film wound about the spool and which is turned ON or OFF in accordance with a change in the contact position of the switch.

Preferably, when the film loaded in one of the first and second spool compartments has been wound around the second spool in the other of the first and second spool compartments, only the first spool of the film is left in one of the first and second spool compartments.

Preferably, the roll film is a Brownie film.

According to another aspect of the present invention, there is provided a camera for receiving a roll film that is provided with a spool and a separate film strip wound around the spool. The camera includes a pair of spool compartments, each being provided with a spool rotating shaft, a pair of drive gear mechanisms to rotate the spool rotating shafts in the pair of spool compartments, a reversible motor, and a planet gear device which transmits the rotation of the reversible motor to one of the pair of drive gear mechanisms in accordance with the rotating direction of the reversible motor.

Preferably, the pair of spool compartments are each provided therein with a sensor which detects whether the roll film is loaded in the associated spool compartment, and further includes a controller that determines the rotating direction of the reversible motor in accordance with the detection result of the sensors.

Preferably, the sensors each include a photoreflector which optically detects the film wound around the spool.

Preferably, the sensors each include a switch which is brought into elastic contact with the outer surface of the film wound about the spool and which is turned ON or OFF in accordance with a change in the contact position of the switch. Preferably, the switch includes a microswitch.

Upon film replacement, a new film is loaded in the spool compartment from which the exposed film has been removed, and thereafter, the leading end of the film is connected to a spool in the other spool compartment. When the rear cover is closed, the camera automatically detects the spool compartment in which the film is loaded and winds the film onto the spool in the other spool compartment to complete the loading operation. Thereafter, the film can be wound onto the other spool at each photographing operation. Thus, no movement of the vacant spool in the spool compartment into the other spool compartment is needed upon replacement of the film, thus resulting in a quick and easy film replacement.

The present disclosure relates to subject matter contained in Japanese Patent Application No.10-91291 (filed on Apr. 3, 1998) which is expressly incorporated herein by reference in its entirety.

BRIEF DESCRIPTION OF THE DRAWINGS

The invention will be discussed below in detail with reference to the accompanying drawings, in which:

FIG. 7 is a flow chart of a film loading operation in a camera according to the present invention.

DESCRIPTION OF THE PREFERRED EMBODIMENT

Figure 1:
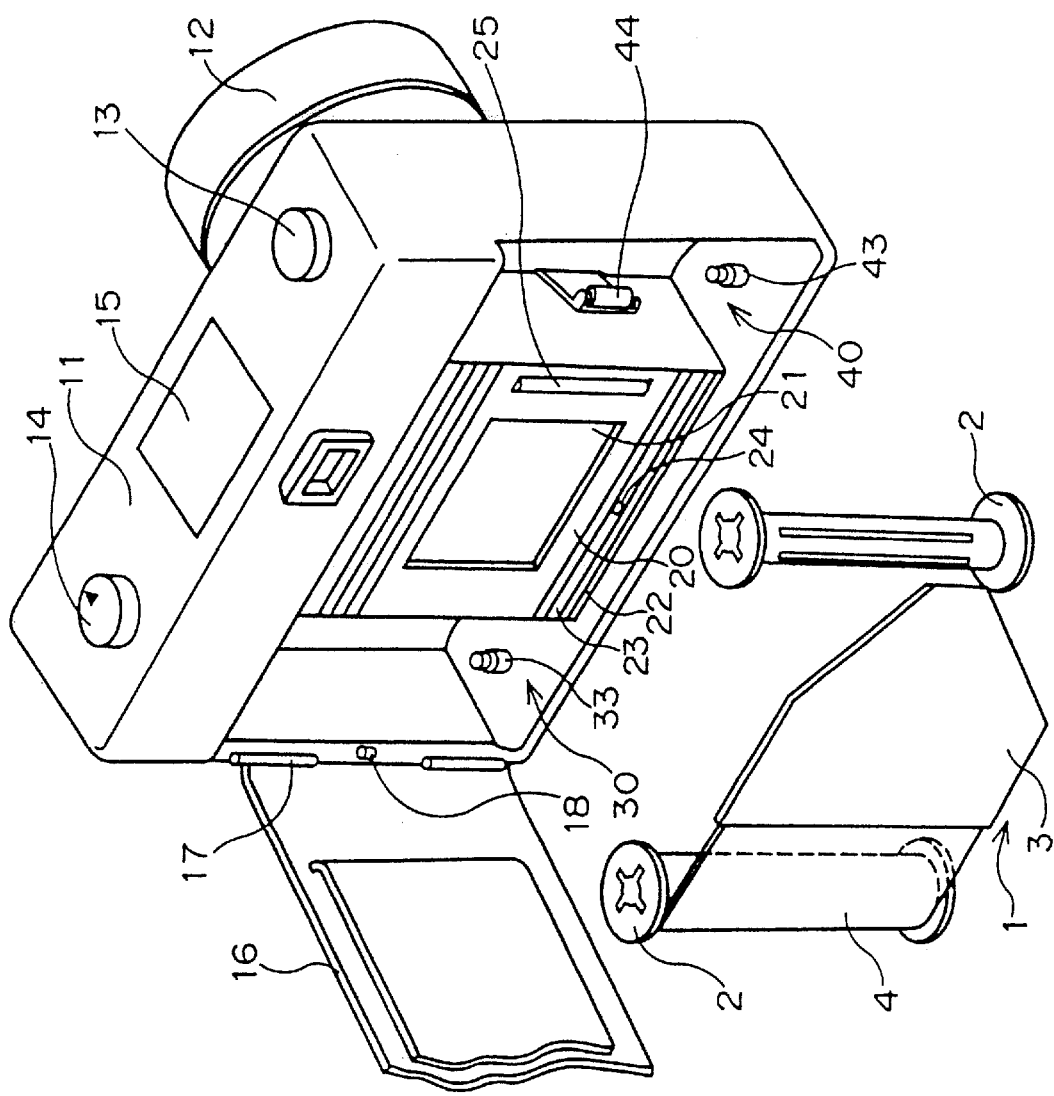
FIG. 1 is a perspective view of a camera according to an embodiment of the present invention.

FIG. 1 shows a perspective view of a medium-sized camera using a Brownie film according to an embodiment of the present invention. A photographing lens 12 is mounted to a front surface of a camera 11. There is a release button 13 as a release switch, a main switch 14 which is actuated to turn the power source ON or OFF, and an LCD (indicator) 15, on the upper surface of the camera 11. A rear cover 16 is connected to the rear surface of the camera 11 through a hinge 17, so that when the rear cover 16 is open, a film can be loaded in or removed from the camera 11. A rear cover switch 18 is provided to detect the opening/closing operation of the rear cover 16. The rear cover switch 18 is turned OFF when the rear cover 16 is open. In this camera 11, a Brownie film 1 which is provided with a spool 2 and a film element 4 wound on the spool 2, and is held by a backing paper strip 3.

Figure 2:
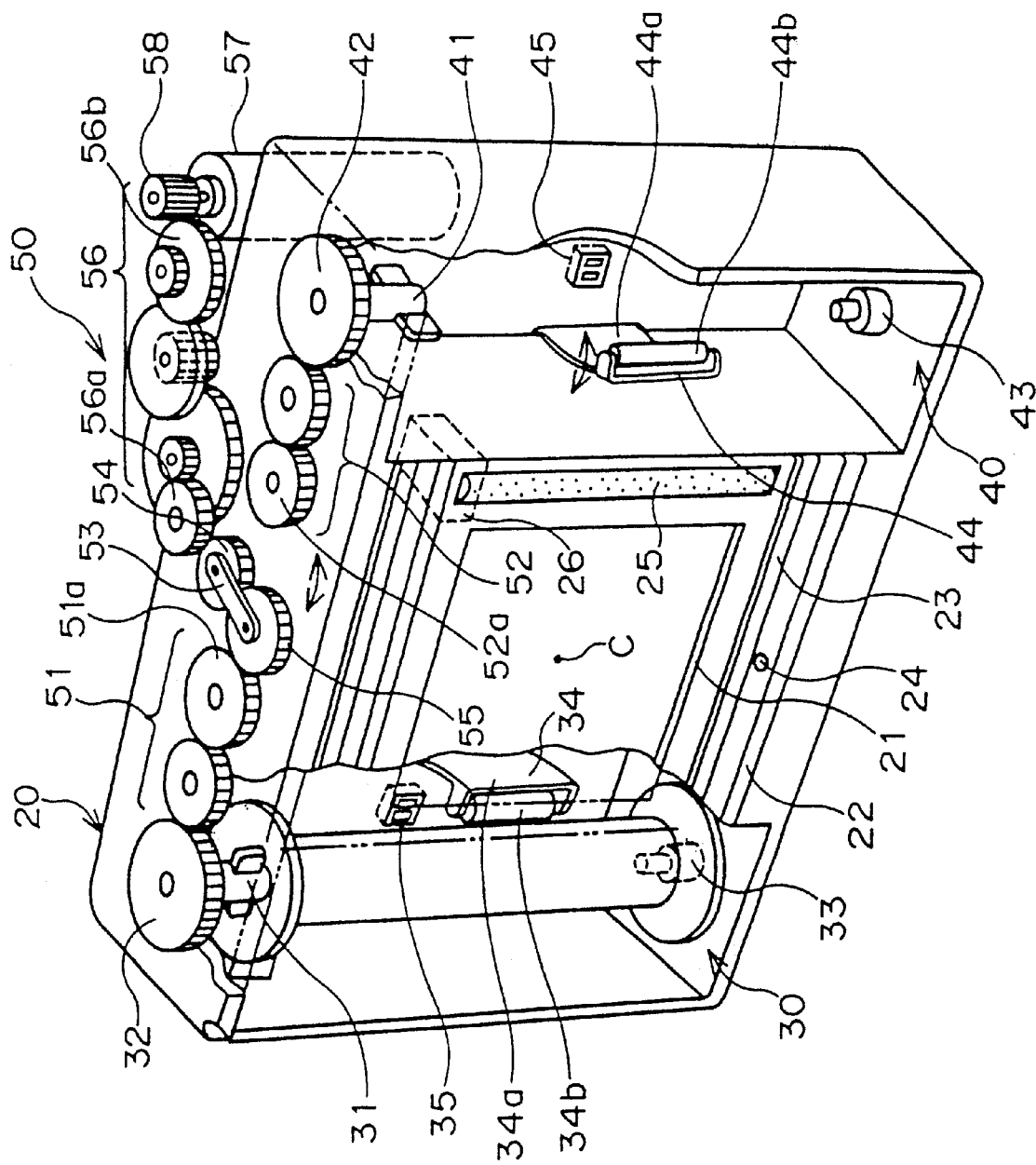
FIG. 2 is a perspective view of a camera body of a camera shown in FIG. 1.

FIG. 2 shows a perspective view of a camera body 20 when the rear cover 16 is open. The camera body 20 is provided on its rear surface with an aperture 21 which defines a photographing frame, at the substantially central portion of the rear surface. Pairs of outer and inner rails 22 and 23 which extend in the film feed direction are provided above and below the aperture 21. There is a first spool compartment 30 and a second spool compartment 40 on opposite sides of the aperture 21 in the lateral direction. Note that a data light emitter 24 is provided between the lower outer rail 22 and the lower inner rail 23, provided below the aperture 21, at the medial position in the lateral direction (horizontal direction) to expose a shutter speed, a diaphragm value, or other photographing data onto the film portion out of the photographing frame. A friction roller 25 which will be discussed hereinafter is provided on the portion of the aperture 21 adjacent the second spool compartment 40. An electronic circuit unit (not shown in FIG. 1) including a control circuit is incorporated in the camera body 20 to perform the general control of the camera including the control of a film winding motor which will be discussed hereinafter.

A film winding mechanism 50 is incorporated in the camera body 20. Namely, a first spool rotating shaft 31 and a second spool rotating shaft 41 are rotatably supported on the upper surfaces of the first spool compartment 30 and the second spool compartment 40 provided in the camera body 20 so as to engage with the spools (first and second spools) 2 of the Brownie film to thereby rotate the same in the same direction. The gears 32 and 42 are in mesh with first and second driven gear trains (a pair of drive gear mechanisms) 51 and 52, respectively, each consisting of a plurality of gears (e.g., two gears) arranged along a line. The gears 32 and 42 are provided with first and second spool rotating shafts 31 and 41 which extend downwards into each spool compartment 30 and 40, respectively. The first gears 51a and 52a of the first and second driven gear trains 51 and 52 are spaced from one another at a predetermined space at the substantially medial position of the aperture in the film feed direction. A swing arm 53 is supported on the upper surface of the camera body 20 at an intermediate position between the first gears 51a and 52a so as to swing about the single pivot end thereof in a plane the same as the plane in which the first gears rotate. The swing arm 53 is provided on the pivot end thereof with a rotatable sun gear 54 and on the other end (free end) with a rotatable planet gear 55 which is in mesh with the sun gear 54. The swing arm 53, the rotatable sun gear 54, and the planet gear 55 constitute a planet gear device. The sun gear 54 is engaged by a terminal gear 56a of a drive gear train 56 consisting of a plurality of small diameter and large diameter gears. A first gear 56b of the drive gear train 56 is in mesh with a pinion 58 mounted to a drive shaft of the film winding motor 57. Note that in the illustrated embodiment, the first and second gear trains 51 and 52 and the gears 32 and 42 are identical, respectively. The gear trains 51 and 52 are arranged symmetrical with respect to the rotating shaft of the sun gear 54. Namely, the drive force of the film produced by the motor or the film winding speed is identical in either film winding direction. Consequently, a user would not recognize a difference in feeling between the film winding operations in opposite directions.

Figure 3A:
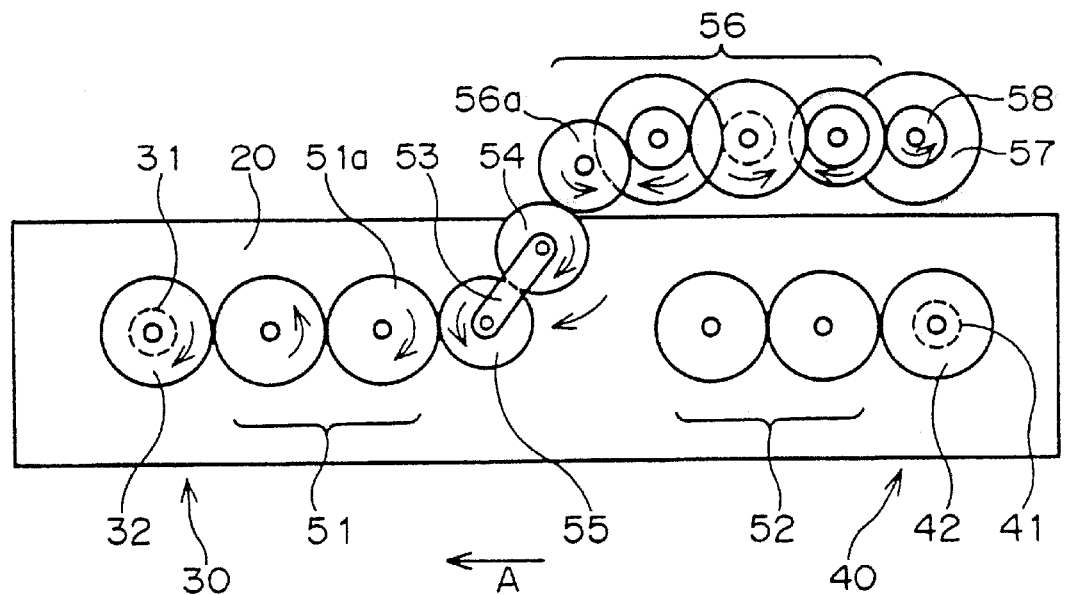
FIGS. 3A and 3B are plan views of a part of a camera body shown in FIG. 2 to explain an operation of a film winding mechanism.
Figure 3B:
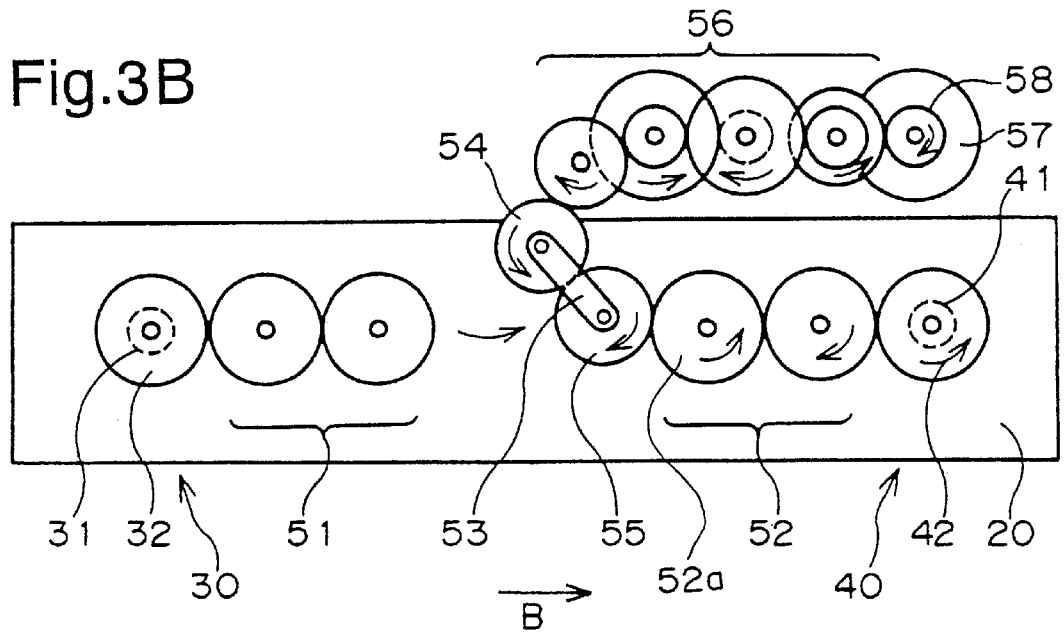

FIGS. 3A and 3B show plan views of the film winding mechanism 50 in different positions. On the assumption that the film winding motor 57 is rotated in the counterclockwise direction as shown in FIG. 3A, the rotational force is transmitted to the sun gear 54 through the pinion 58 and the drive gear train 56. Consequently, the sun gear 54 is rotated in the clockwise direction which is opposite to the rotation direction of the terminal gear 56a, due to the engagement of the terminal gear 56a of the drive gear train 56 and the sun gear 54, so that the swing arm 53 swings in the clockwise direction. As a result of the swing movement of the swing arm 53, the planet gear 55 engages with the first gear 51a of the first gear train 51, so that the rotational force of the sun gear 54 is transmitted to the first gear train 51. Consequently, the gear 32 which is in mesh with the first gear train 51 is rotated in the clockwise direction to thereby rotate the first spool rotating shaft in the clockwise direction. Consequently, the film is wound in the direction toward the first spool compartment, i.e., in the direction "A" in FIG. 3A.

If the film winding motor 57 is rotated in the clockwise direction as shown in FIG. 3B, the sun gear 54 is rotated in the counterclockwise direction by the drive gear train 56, so that the swing arm 53 swings in the same direction. As a result, the planet gear 55 engages with the first gear 52a of the second gear train 52, so that the gear 42 which is in mesh with the second gear train 52 is rotated in the counterclockwise direction to thereby wind the film in the direction toward the second spool compartment, i.e., in the direction "B" in FIG. 3B. Namely, in the film winding mechanism 50, one of the first and second spool rotating shafts 31 and 41 can be selectively rotated by reversing the rotation of the film winding motor 57. Note that when one of the spool rotating shafts (31 or 41) is rotated, since the gear train which is engaged by the other spool rotating shaft is disengaged from the planet gear 55, the other spool rotating shaft and the gear train associated therewith are free to rotate.

As can be seen in FIG. 2, spool support shafts 33 and 43 are secured to the lower surfaces of the first and second spool compartments 30 and 40 and are aligned with the axes of the spool rotating shafts 31 and 41, respectively. The first and second spool rotating shafts 31 and 41 and the spool support shafts 33 and 43 make it possible to rotatably support the spools (first and second spools) 2 loaded in the spool compartments 30 and 40. The spool rotating shafts 31 and 41 are spaced from the median of the aperture 21 in the lateral direction at an equi-distance, i.e., the spool rotating shafts 31 and 41 are arranged in a line-symmetry with respect to the medial line of the aperture 21. The spool compartments 30 and 40 are respectively provided on their inner wall surfaces with film pressing rollers 34 and 44 which are brought into elastic contact, in the radial direction, with the outer surface of the film which is wound by one of the spools 2 to thereby prevent the film being loosened. The film pressing rollers 34 and 44 are provided with roller elements 34b and 44b which are rotatably supported at the front ends of elastically deformable arms 34a and 44a which are secured at their one end to the camera body, so that the roller elements 34b and 44b can be brought into elastic contact with the film surface due to the resilience of the elastically deformable arms 34a and 44a.

Figure 4A:
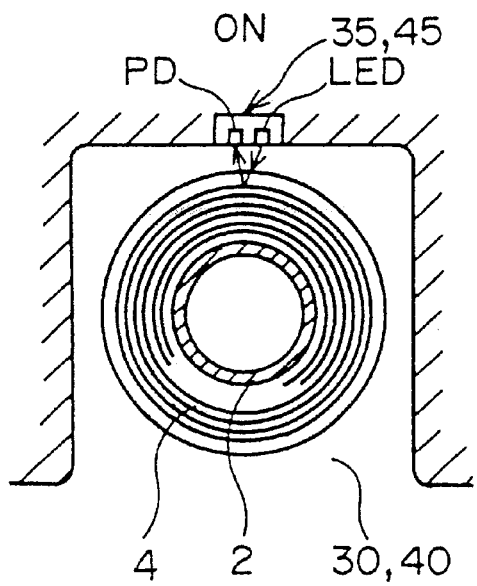
FIGS. 4A and 4B are sectional views of a spool compartment sensor to explain an operation thereof.
Figure 4B:
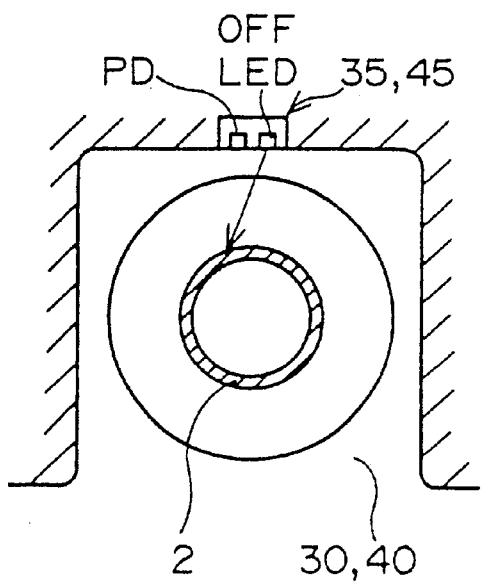

The spool compartments 30 and 40 are also provided on their inner wall surfaces with photo reflectors 35 and 45 separate from the film pressing rollers, which serve as film sensors, corresponding to the spools 2 loaded in the respective spool compartments. The photo reflectors 35 and 45 are identical and are each provided therein with a pair of light emitting diode LED and photo diode PD. As may be seen in FIG. 4A, light emitted from the light emitting diode LED is reflected by the outer surface of the film 3 loaded in the spool compartment and is received by the photo diode PD, so that the sensor 35 (45) is turned ON. Consequently, it can be detected by the sensor that the film 4 is loaded in the spool compartment or that the film is wound around the spool 2 provided in the spool compartment. If no film is loaded, i.e., for example, if only the spool 2 exists in the spool compartment, as shown in FIG. 4B, no light emitted from the LED of the sensor 35 (45) is received by the PD and hence the sensor 35 (45) is OFF.

The friction roller 25 which is provided between the aperture 21 and the second spool compartment 40 is brought into contact with the inner surface of the film which is wound, so that the friction roller 25 (i.e., the shaft of the friction roller) is rotated due to the friction caused by the movement of the film during the winding operation. The friction roller 25 is provided on its one end with a pulse generator (circuit) 26 which generates pulse signals in accordance with the rotation of the friction roller 25 (shaft thereof). The pulse generator 26 can include, for example, a magnet (not shown) which is rotated in accordance with the rotation of the shaft of the friction roller 25 and a Hall element (not shown) disposed in the vicinity of the magnet, so that the power produced by the Hall element due to a change in the magnetic flux density in accordance with the rotation of the magnet is output as pulse signals. Alternatively, the pulse generator can be composed of a light interception plate which is rotated in accordance with the rotation of the shaft of the friction roller 25 and a photo detector having sensor elements disposed on opposite sides of the light interception plate, so that pin holes formed in the light interception plate can be detected by the photo detector which generates pulse signals. Consequently, the amount of rotation of the friction roller 25 (i.e., the amount of the winding of the film) is detected by counting the number of pulses output from the pulse generator 26.

Figure 5:
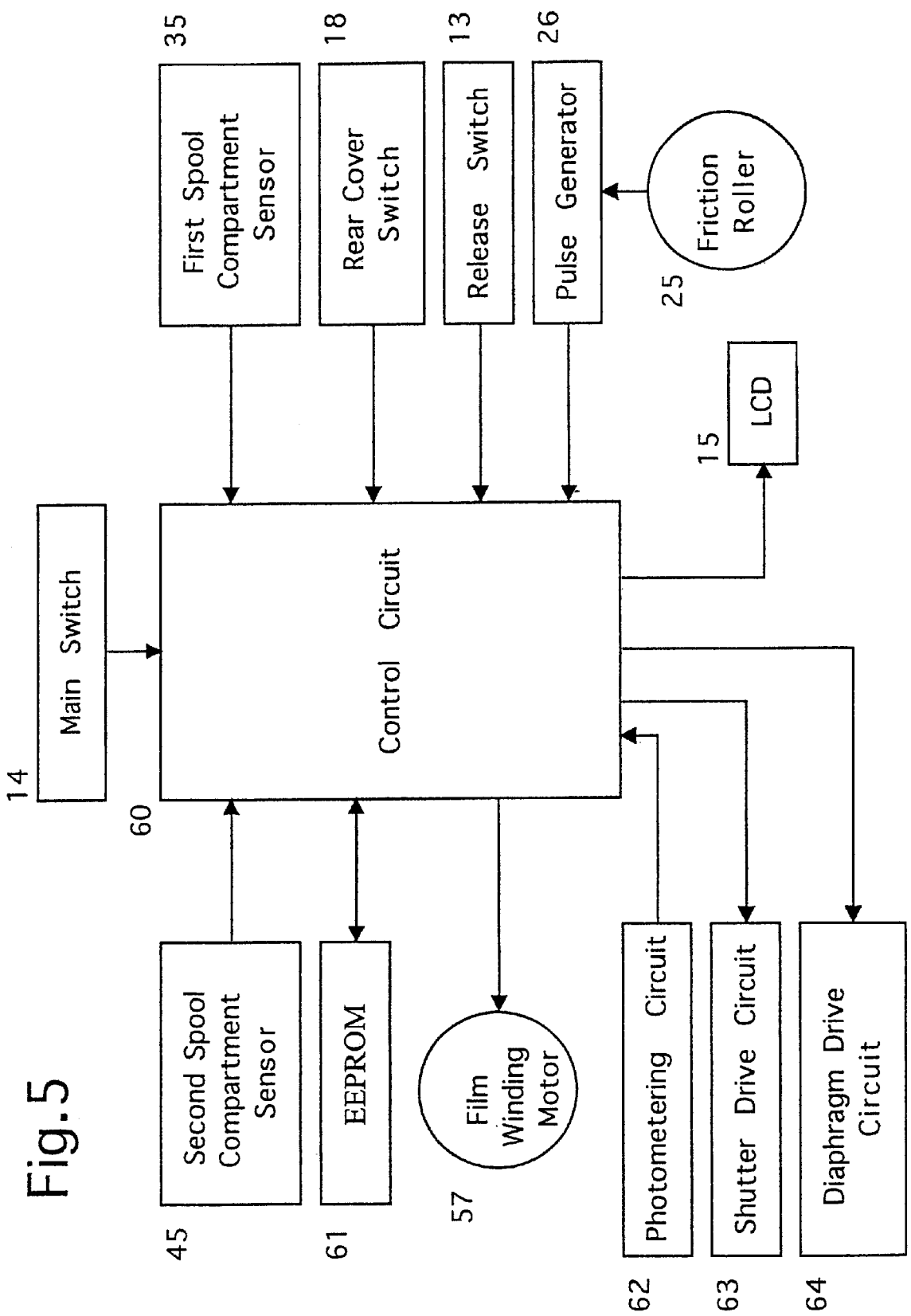
FIG. 5 is a circuit block diagram of an electronic circuit unit.

FIG. 5 shows a block diagram of an internal structure of the electronic circuit unit provided in the camera body.

The ON/OFF data of the various switches including the main switch 14, the rear cover switch 18, and the release switch 13, etc., is input to the control circuit 60. The detection signal which is issued when it is detected by the first and second spool sensors 35 and 45 that the film is loaded in the first and second spool compartments is also supplied to the control circuit 60. The pulse signals which are generated by the pulse generator 26 in accordance with the rotation of the friction roller 25 during the film winding operation are also input as a film winding amount signal to the control circuit 60. The control circuit 60 performs a predetermined arithmetic operation, based on the above-mentioned signals input thereto; reads/writes the data from or into the EEPROM 61; and controls the rotation of the film winding motor 57 in accordance with the calculation results. The LED 15 is connected to the control circuit 60 so as to indicate necessary information. Connected to the control circuit 60 are a photometering circuit 62, a shutter drive circuit 63 and a diaphragm drive circuit 64, for the photographing operation of the Brownie film; no detailed explanation therefor will be given herein.

In the camera constructed as above, when a Brownie film is loaded in the first or second spool compartment 30 or 40 upon film replacement, the film can be wound on the vacant spool in the second or first spool compartment, and consequently, the photographing operation for the loaded film can be carried out. For instance, when the film loaded in the first spool compartment 30 has been completely exposed in the previous photographing operation, the film has been entirely wound on the spool 2 in the second spool compartment 40. Therefore, the spool 2 in the first spool compartment 30 is vacant of the film. For a subsequent photographing operation, the exposed film in the second spool compartment 40 is removed and a new film is loaded in the second spool compartment. Thereafter, the leading end of the new film is inserted in the slit of the vacant spool 2 in the first spool compartment 30. The film is wound and fed toward the first spool compartment 30 at each photographing operation.

Conversely, when the film loaded in the second spool compartment 40 has been completely exposed in the previous photographing operation, the film has been entirely wound on the spool 2 in the first spool compartment 40. Therefore, the spool 2 in the second spool compartment 40 is vacant of the film. For a subsequent photographing operation, the exposed film in the first spool compartment 30 is removed and a new film is loaded in the first spool compartment. The film is wound and fed toward the second spool compartment 40 at each photographing operation.

In either case, the film can be loaded in one of the spool compartments and can be exposed, and hence the film replacement can be carried out easily and quickly.

The photographing operation including the film replacement will be discussed below, referring to the flow charts shown in FIGS. 6 and 7.

The main operation (S100) begins when the main switch 14 is turned ON (S101). The control circuit 60 reads the winding direction flag FW, the film loading completion flag FL, and the film loading flag FS, stored in the EEPROM 61 (S102). Thereafter, the loading operation is carried out (S200). In the loading operation, as shown in FIG. 7, the re-closure of the rear cover 16 which has been opened for the film replacement is detected when the rear cover switch 17 is turned ON from OFF (S201). Whether the film is loaded in the first spool compartment 30 or in the second spool compartment 40 is detected by the spool compartment sensors (photo reflectors) 35 and 45 provided in the respective spool compartments (S202). Namely, if both the spool compartment sensors 35 and 45 are OFF, no film is loaded. Consequently, the controller 60 sets the film loading flag FS=0 and the control is returned to the main operation (S203).

If one of the spool compartment sensors 35 and 45 is turned ON, the state of the first spool compartment sensor 35 is judged (S204), If the first spool compartment sensor 35 is OFF, it is judged that the film is loaded in the second spool compartment 40, so that the controller 60 sets the winding direction flag FW=0 to set the winding direction of the film toward the first spool compartment 30 from the second spool compartment 40 (S205). If the first spool compartment sensor 35 is ON, whether or not the second spool compartment sensor 45 is OFF is checked. If the second spool compartment sensor 45 is OFF (S206), the controller 60 sets the winding direction flag FW=1 to set the winding direction of the film toward the second spool compartment 40 from the first spool compartment 30 (S207). When the winding direction FW is set, it is judged that the film is loaded so that the film loading flag is set to be FS=1 (S208). If both the first and second spool compartment sensors 35 and 45 are ON, whether or not the film has been loaded (i.e., whether the loading completion flag FL is FL=1) is checked (S209). If FL=1, the control is returned to the main operation. If FL=0 (e.g., an error operation), the indication operation of the LCD is carried out (S210). Thereafter, the control is returned to the main operation.

If the film loading flag FS is 1 (FS=1), the control circuit 60 drives the film winding motor 57 in accordance with the value of the winding direction flag FW (S211). Namely, if FW=1, the film winding motor is driven in the direction to wind the film into the second spool compartment 40. For example, in the arrangement shown in FIG. 3B, the film winding motor 57 is rotated in the clockwise direction. Consequently, the planet gear 55 which is swung by the sun gear 54 through the drive gear train 56 is engaged by the second gear train 52, so that the first spool rotating shaft 41 in the second spool compartment is rotated in the counterclockwise direction. As a result, the film in the first spool compartment 30 is wound in the direction "B" onto the spool in the second spool compartment 40. Consequently, the friction roller 25 is rotated, so that pulses are generated by the pulse generator 26. The controller 60 counts the number of pulses and detects that a predetermined amount of film has been wound in accordance with the counted number of pulses. Consequently, the completion of the loading is detected (S212) and thereafter, the loading completion flag FL is set FL=1 (S213) to stop the film winding motor (S214). Thus, the loading operation is completed (S200) and the control is returned to the main operation.

Figure 6:
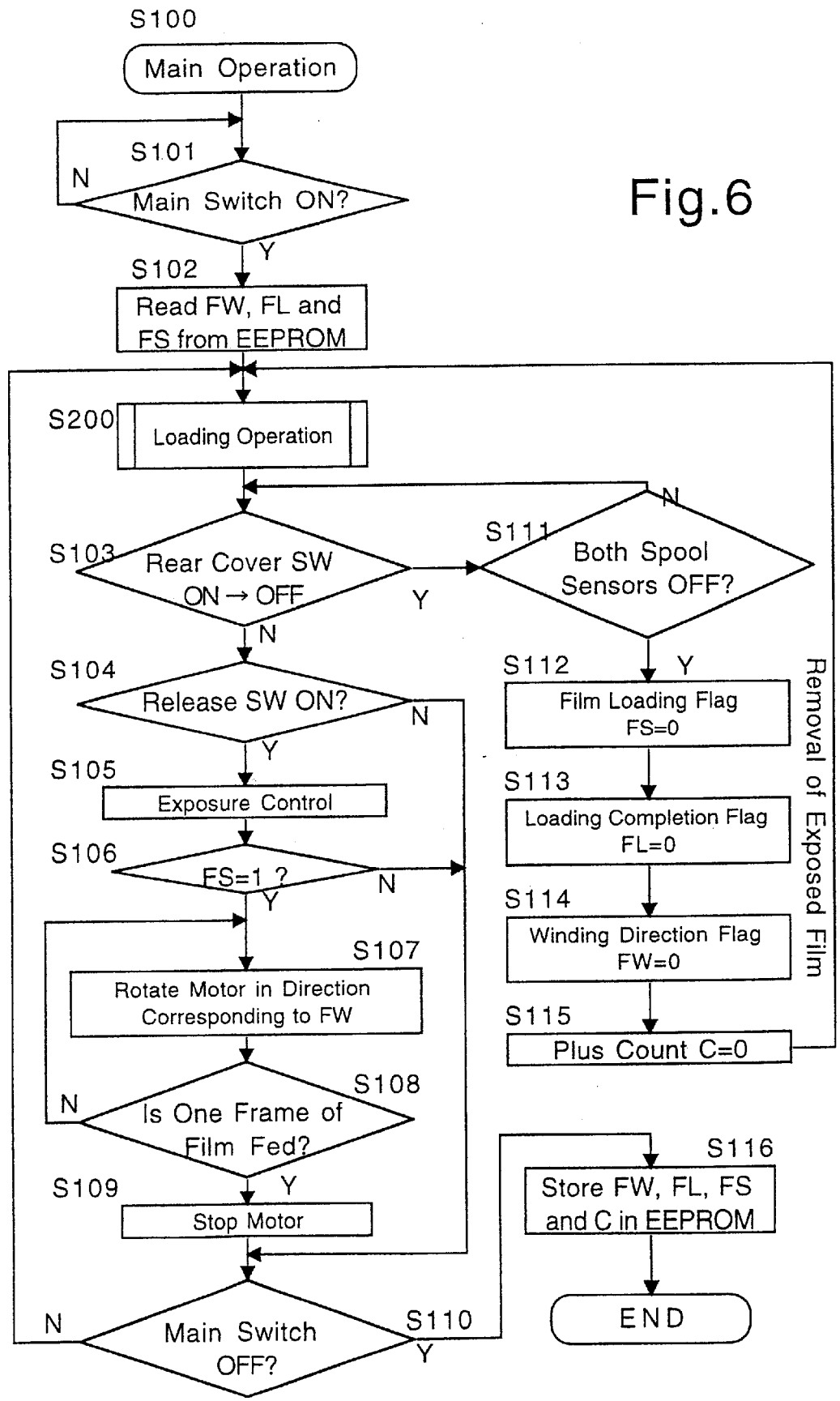
FIG. 6 is s flow chart of the main operation of a camera according to the present invention.

If the loading operation is completed in FIG. 6 (S200), the controller 60 judges the state of the rear cover switch 18 (S103). If the rear cover switch 18 is not turned OFF (from ON), so that the rear cover is closed, whether the release switch 13 is turned ON is checked (S104). If the release switch 13 is turned ON, the exposure operation is carried out (S105). Thereafter, if the film loading flag FS is 1 (FS=1), the photographing operation is carried out (S106). Thereafter, the film winding motor 57 is rotated in the direction corresponding to the value of the winding direction flag FW (S107). The winding of the film by one frame is detected in accordance with the number of pulses generated from the pulse generator 26 in accordance with the rotation of the friction roller 25 (S108). Thereafter, the film winding motor 57 is stopped (S109).

Note that if the film loading flag FS is 0 (FS=0) after the exposure operation (S105), no film is loaded and hence no film winding operation is carried out to reduce the power consumption of the battery. If the main switch 14 is ON (S110), the control proceeds to step S200 (loading operation). As mentioned above, if the loading operation has been completed, the control skips the loading operation and proceeds to the photographing operation for the next film frame.

If the rear cover switch 18 is turned OFF from ON at step S103, i.e., if the rear cover 16 is open, whether or not both the spool compartment sensors 35 and 45 are turned OFF is checked to judge whether the photographing operation for all the film frames has been completed so that the film has been unloaded (S111). If both the spool compartment sensors 35 and 45 are OFF, the film loading flag FS=0, the loading completion flag FL=0, and the winding direction flag FW=0 are set (S112 to S114). Also, the pulse count C=0 is set (S115), and the control is returned to the loading operation S200.

If the spool compartment sensor 35 or 45 is not OFF, i.e., if one or both of the spool compartment sensors 35 and 45 is/are ON, the film is loaded and hence the loop of operations at steps S103 and S111 is repeated until the film is unloaded. Consequently, if the rear cover 16 is opened and is closed again without removing the film, it is possible to prevent the controller 60 from incorrectly judging that a new film is loaded and from carrying out the photographing operation for the exposed film. Moreover, if the main switch 14 is turned OFF at step S110, the control circuit 60 stores the values of the flags FS, FL and FW, and the counted number C of pulses (S116) in the EEPROM 61.

As may be understood from the above discussion, in the illustrated embodiment, upon film replacement, the exposed film is first removed from the spool compartment in which the film has been wound, and thereafter, a new film is loaded in the same spool compartment and the leading end of the new film is engaged by the spool of the other spool compartment. Thereafter, the rear cover is closed. The above mentioned operations only are manually carried out by a user. Once the rear cover is closed, the camera automatically detects the spool compartment in which the film is loaded; winds the film into the other spool compartment to complete the loading operation; and winds the film at each exposure operation. Therefore, upon replacement of the film, no movement of the vacant spool in one spool compartment into the other spool compartment is necessary, thus resulting in a quick film replacement. Thus, a photographer can appropriately take a picture without missing a shutter release opportunity.

Figure 8A:
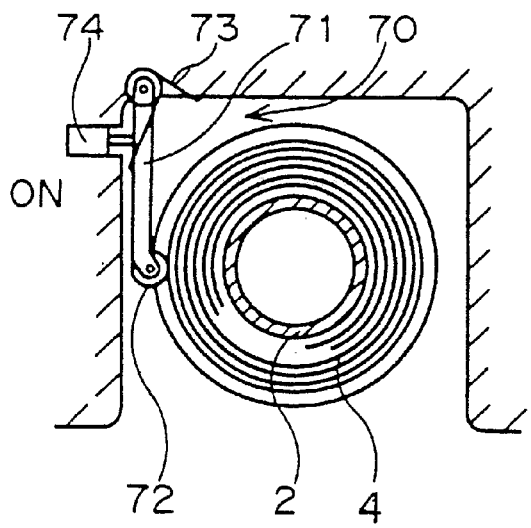
FIGS. 8A and 8B are sectional views of another spool sensor.
Figure 8B:
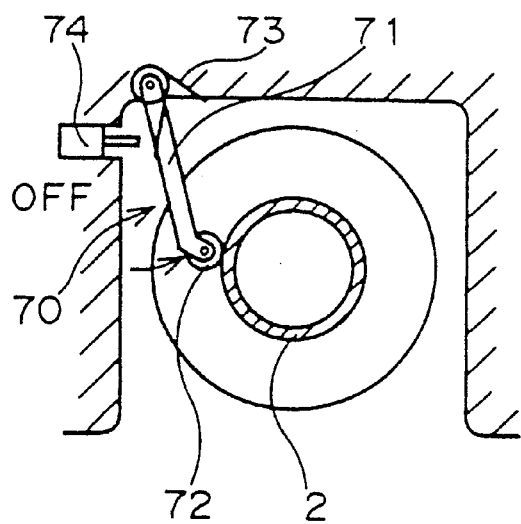

It is alternatively possible to use mechanical switches to detect the film loaded in the spool compartments. FIGS. 8A and 8B show a mechanical switch 70 by way of example. In the mechanical switch 70, a film pressing roller similar to the film pressing roller in the previous embodiment is employed. Namely, the spool compartment switch 70 is composed of a swing arm 71 which is connected to the camera body 20 to swing in the radial direction of the spool 2, a roller 72 which is mounted to the free end of the swing arm 71, and a torsion spring 73 which elastically presses the roller 72 against the outer surface of the film loaded in the spool compartment. A microswitch 74 is opposed to the base end of the swing arm 71, so that the microswitch 74 is turned ON or OFF in accordance with the angular displacement of the swing arm 71. Consequently, as shown in FIG. 8A, when the film 4 is wound around the spool 2, the swing arm 71 is swung in the radially outward direction of the spool, so that the microswitch 74 is turned ON to detect the presence of the film 4 in the spool compartment, i.e., to detect that the film is loaded or has been wound around the spool. As shown in FIG. 8B, if no film is wound around the spool 2, the swing arm 71 is swung in the radially inward direction of the spool and hence the microswitch 74 is turned OFF.

Although a commercially available Brownie film as a medium-sized film in the illustrated embodiment, the film to be used is not limited to a specific size. Namely, the present invention can be equally applied to any camera in which a spool separation type film can be used.

As may be understood from the foregoing, according to the present invention, a roll film can be loaded in any one of a pair of spool compartments provided in the camera body and provision is made for a reversible film winding mechanism for winding the film loaded in one of the spool compartments into the other spool compartment. Consequently, upon replacement, once a new film is loaded in the spool compartment from which the exposed film has been removed, the film can be automatically wound into the other spool compartment during the loading operation or the winding operation after exposure without need for the movement of the vacant spool into the other spool compartment, thus resulting in a quick film replacement. Moreover, the spool compartments are each provided with a sensor which detects the presence or absence of the film therein, so that the film winding operation of the reversible film winding mechanism can be controlled in accordance with the detection result of the sensor. Consequently, once the film is loaded in one of the spool compartments, the camera automatically winds the film into the other spool compartment and performs the loading and photographing operations. Thus, in a camera for receiving a roll film according to the present invention, not only can the film be quickly and easily loaded but also a photographer can take a picture without missing a shutter release opportunity.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera for receiving a roll film, the roll film being provided with a separate film strip wound around a first spool, and a second spool, said camera comprising:
   a first and second spool compartment, wherein the roll film can be loaded into either said first or second spool compartments and the second spool can be loaded into a remaining one of said first or second spool compartments; and
   a reversible film winding mechanism that winds the film strip of the roll film onto the second spool, wherein the film winding direction can be reversed depending on which one of said first and second spool compartments the roll film is loaded into.

2. A camera for receiving a roll film according to claim 1, wherein said reversible film winding mechanism is driven by a reversible motor, so that the film strip can be unwound from said first spool compartment and wound into said second spool compartment or from said second spool compartment into said first spool compartment, in accordance with the forward or reverse rotation of said motor.

3. A camera for receiving a roll film according to claim 2, wherein said reversible film winding mechanism comprises a drive gear portion which is driven by said reversible motor, and driven gear portions which are connected to spool rotating shafts provided in said spool compartments, wherein said drive gear portion can selectively engage said driven gear portions in accordance with the rotation direction of said reversible motor so as to transmit the rotation of said reversible motor to said selected spool rotating shaft.

4. A camera for receiving a roll film according to claim 3, wherein said gear portions of said reversible film winding mechanism are constructed so that the rotational speeds of said spool rotating shafts and the film winding speeds are substantially the same when said motor is rotated in the forward direction and reverse direction.

5. A camera for receiving a roll film according to claim 1, wherein said first and second spool compartments are each provided therein with a sensor which detects whether the roll film is loaded in an associated spool compartment, and said reversible film winding mechanism determines the film winding direction to wind the film toward one of said first or second spool compartments in which no film is loaded from the other of said first and second spool compartments in which the film is loaded, in accordance with the detection result of said sensors.

6. A camera for receiving a roll film according to claim 5, wherein said sensors each comprise a photoreflector which optically detects the film wound around the spool.

7. A camera for receiving a roll film according to claim 5, wherein said sensors each comprise a switch which is brought into elastic contact with an outer surface of the film wound about the spool and which is turned ON or OFF in accordance with a change in the contact position of said switch.

8. A camera for receiving a roll film according to claim 1, wherein said reversible film winding mechanism is capable of winding the film strip of the roll film loaded in one of said first and second spool compartments around the second spool in the other of said first and second spool compartments until the first spool of the roll film is left, without film wound thereon, in said one of said first and second spool compartments.

9. A camera for receiving a roll film according to claim 1, wherein the roll film is a 120 or 220 roll film.

10. A camera for receiving a roll film, the roll film being provided with a spool and a separate film strip wound around the spool, said camera comprising:

a pair of spool compartments, each being provided with a spool rotating shaft;

a pair of drive gear mechanisms to rotate said spool rotating shafts in said pair of spool compartments;

a reversible motor; and a planet gear device which transmits the rotation of said reversible motor to one of said pair of drive gear mechanisms in accordance with the rotating direction of said reversible motor.

11. A camera for receiving a roll film according to claim 10, wherein said pair of spool compartments are each provided therein with a sensor which detects whether the roll film is loaded in an associated spool compartment, and further comprising a controller that determines the rotating direction of said reversible motor in accordance with the detection result of said sensors.

12. A camera for receiving a roll film according to claim 11, wherein said sensors each comprise a photoreflector which optically detects the film wound around the spool.

13. A camera for receiving a roll film according to claim 11, wherein said sensors each comprise a switch which is brought into elastic contact with the outer surface of the film strip wound about the spool and which is turned ON or OFF in accordance with a change in the contact position of said switch.

14. A camera for receiving a roll film according to claim 13, wherein each said switch comprises a microswitch.

* * * * *

UNITED STATES PATENT AND TRADEMARK OFFICE
CERTIFICATE OF CORRECTION

PATENT NO. : 6,223,003 B1
DATED : April 24, 2001
INVENTOR(S) : Kiyoshi Kawano

Page 1 of 1

It is certified that error appears in the above-identified patent and that said Letters Patent is hereby corrected as shown below:

<u>Title page,</u>
Item [73], Assignee: "Asahi Kogaku <u>Kabushiki</u> Kaisha, Tokyo (JP)" should be -- Asahi Kogaku <u>Kogyo</u> Kabushiki Kaisha, Tokyo (JP) --

Signed and Sealed this

Fifth Day of February, 2002

Attest:

JAMES E. ROGAN
*Attesting Officer*   *Director of the United States Patent and Trademark Office*